United States Patent
Peng

[11] Patent Number: 6,108,108
[45] Date of Patent: Aug. 22, 2000

[54] PLATEN TYPE SCANNER DRIVING MECHANISM (1)

[75] Inventor: Sheng Yeh Peng, Taipei Shien, Taiwan

[73] Assignee: Silitek Corporation, Taipei, Taiwan

[21] Appl. No.: 09/044,981

[22] Filed: Mar. 20, 1998

[51] Int. Cl.⁷ .................................................. H04N 1/04
[52] U.S. Cl. .............................................. 358/497; 399/211
[58] Field of Search ........................... 358/471, 474, 358/497, 494, 496, 401, 505, 506, 513, 514, 487; 382/312; 399/211, 380; 355/75; 250/208.1, 234–236; H04N 1/04

[56] References Cited

U.S. PATENT DOCUMENTS

| | | | |
|---|---|---|---|
| 5,734,483 | 3/1998 | Itoh | 358/497 |
| 5,778,277 | 7/1998 | Wenthe, Jr. et al. | 358/474 |
| 5,857,133 | 1/1999 | Sun | 399/211 |

*Primary Examiner*—Cheukfan Lee
*Attorney, Agent, or Firm*—Rosenberg, Klein & Lee

[57] ABSTRACT

A type of platen type scanner driving mechanism (1), comprising mainly an optical module, an elastic component, a carrier table, a fixed lever, a wire and a driving unit that are located within a scanning device composed of an upper casing and a lower casing, driving the optical module to move and perform scanning operation, to save the driving force of the driving unit, and to reduce the turning distance.

1 Claim, 6 Drawing Sheets

PLATEN TYPE SCANNER DRIVING MECHANISM (1)

BACKGROUND OF THE INVENTION

The subject matter relates to a platen type scanner driving mechanism (1), or more specifically, to a platen type scanner driving mechanism (1) that will save the force of the driving unit and reduce its turning distance.

Conventionally, with a prior art of platen type scanner driving device, the object to be scanned is placed in a fixed position, then an electric charge coupler module or a contact type image detector module or such an optical module is driven by the driving unit, so that the optical module will perform a scanning operation on the object to be scanned.

The light produced from the light source is shone onto the object to be scanned, the reflected light travels from the reflecting mirror to the lens for convergence, then the converged light is focused onto the electric charge coupler, then said electric charge coupler will process the optical signals into acceptable analog or digital signals.

In aforesaid conventional platen type scanning device, as shown in FIG. 1, the driving unit is pulled at two ends of the optical module 13 by the wire 11, to drive the optical module 13 to move to the left and right along a guide track. However, it has the shortcomings of excessive turning distance, excessive load on the driving unit, and much waste of motor force.

It is obvious from the above that aforesaid conventional platen type scanner driving mechanism does involve inconveniences and shortcomings in actual applications, that need to be redressed.

To seek possible improvement on said shortcomings, the subject inventor has devoted in the research, accompanied by technical applications, and has finally presented a reasonably designed subject matter with effective improvement of said shortcomings.

SUMMARY OF THE INVENTION

The primary objective of the subject matter is to present a platen type scanner driving mechanism (1) that is located in a casing, comprising mainly an optical module, at least one elastic component, a carrier table, a fixed lever, a wire, a number of idlers and a driving unit, etc., below the optical module is an elastic component, the elastic component is supported between the optical module and the carrier table, the fixed lever is fitted to the carrier table, the wire is wound onto the idlers to move in cycles in keeping with the driving unit, the driving unit drives the idlers to move the optical module in parallel movement.

Wherein, between the idlers may be fitted a spring, and the driving unit has a motor and a number of driven gears.

To enable better understanding of the characteristics and technical contents of the subject matter, please refer to the following detailed description with drawings; however, the attached drawings are only for the purposes of reference and description, which shall not be based to restrict or limit the subject matter:

BRIEF DESCRIPTION OF NUMERALS

Figure 1:
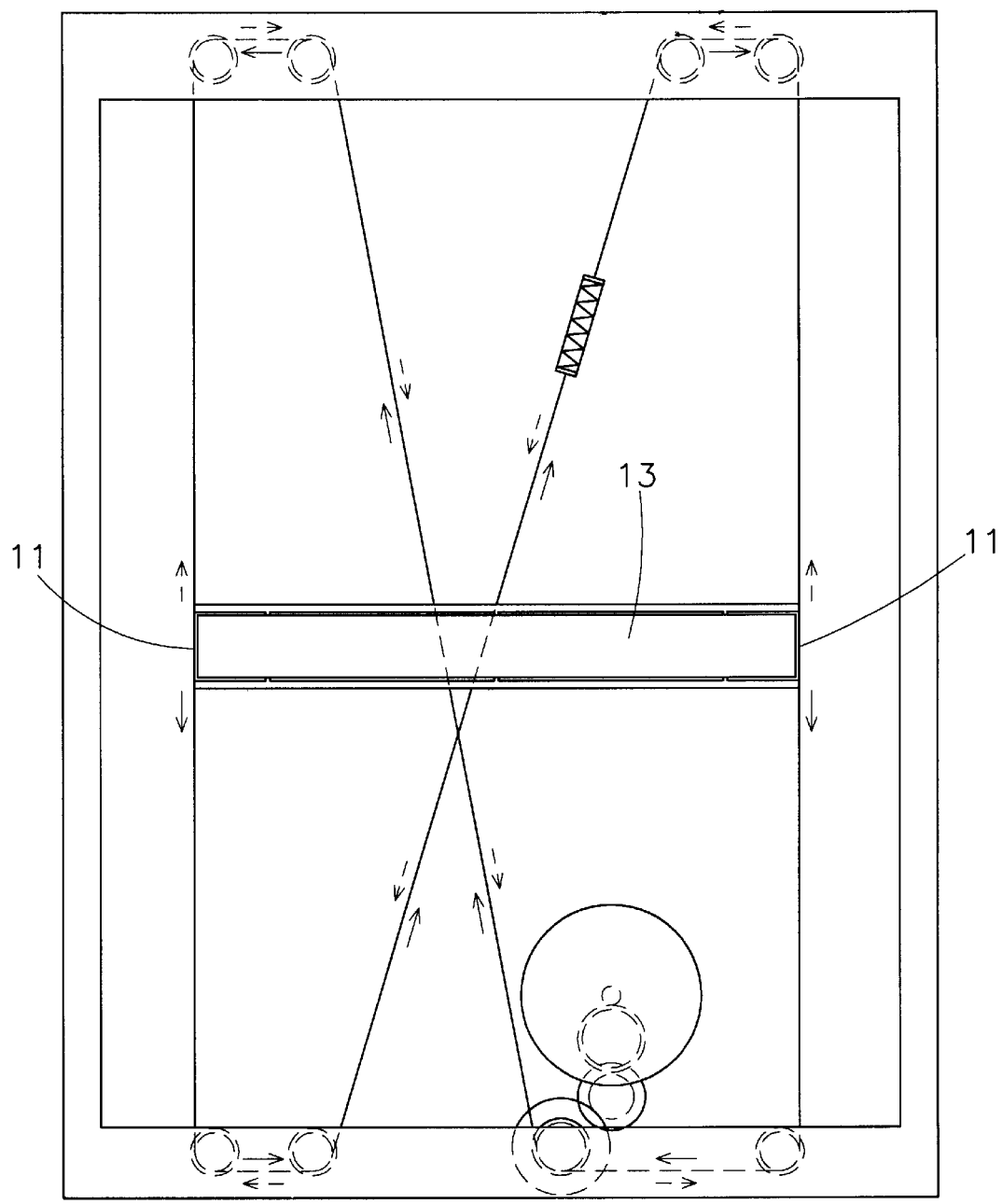
FIG. 1 is a plan view of a prior art of a platen type scanning device driving mechanism.
Figure 2:
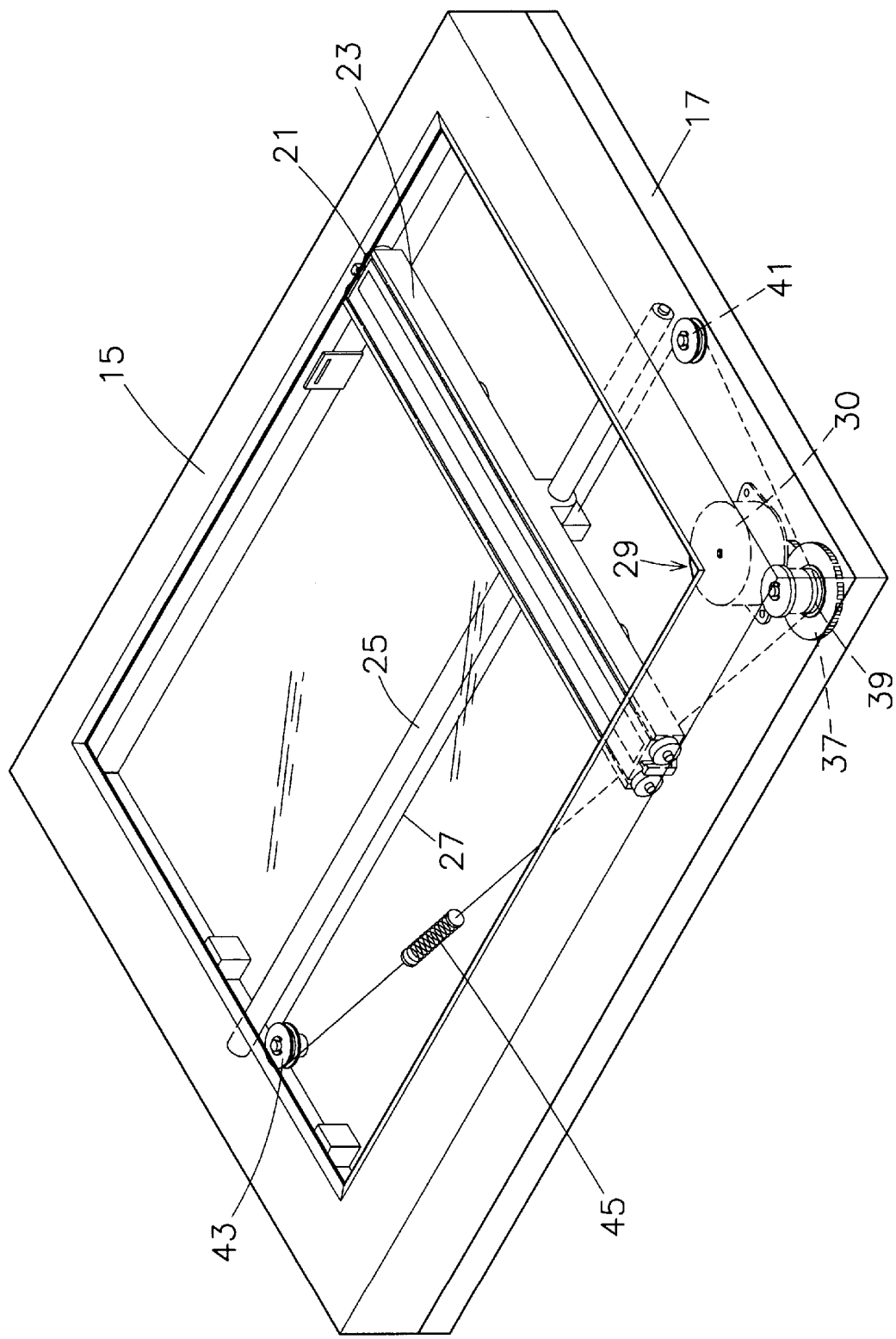
FIG. 2 is a perspective assembled view of the subject matter of platen type scanner driving mechanism (1).
Figure 3:
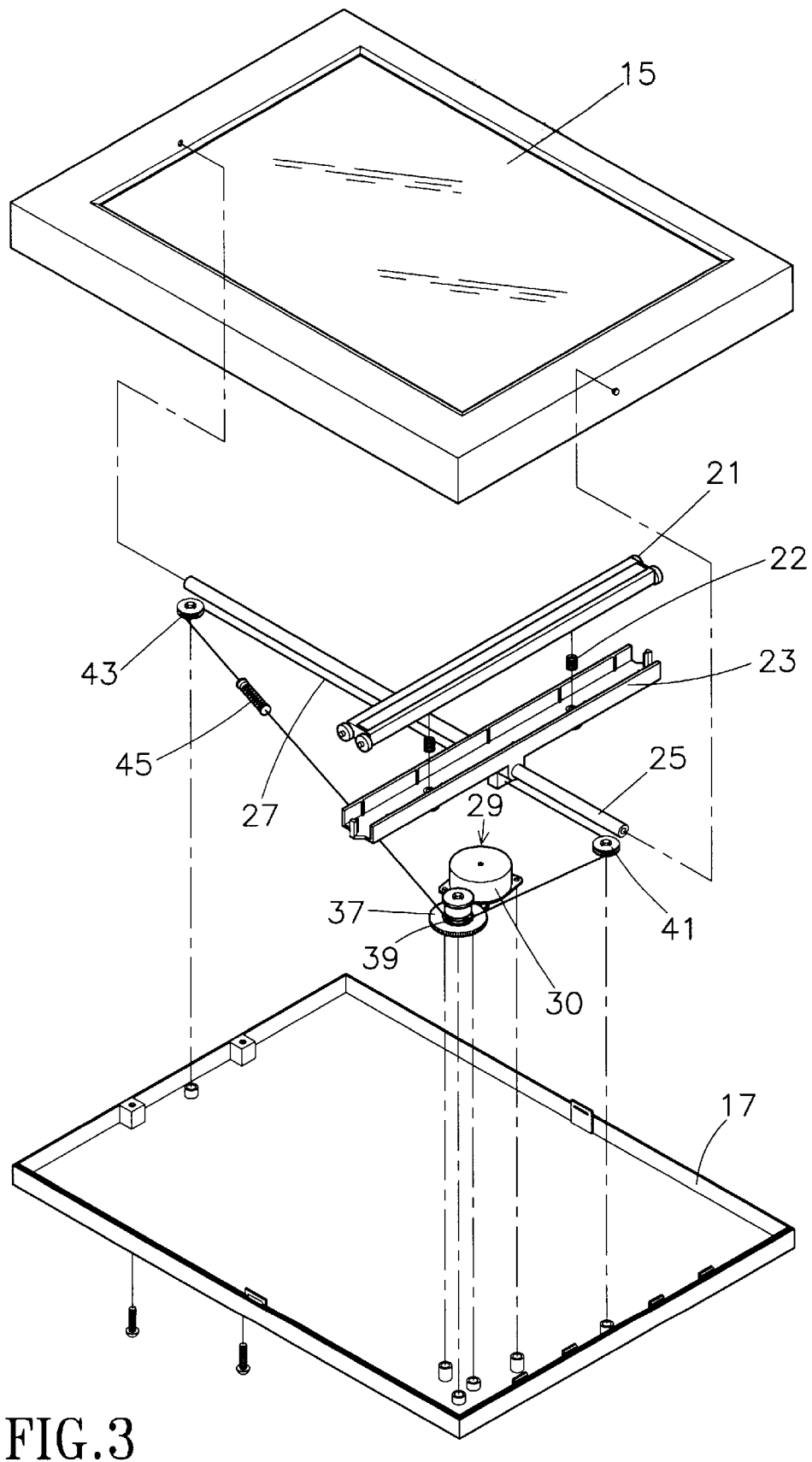
FIG. 3 is an exploded view of the subject matter a platen type scanner driving mechanism (1).

| | |
|---|---|
| 11 | wire |
| 13 | optical module |
| 15 | upper casing |
| 17 | lower casing |
| 21 | optical module |
| 22 | elastic component |
| 23 | carrier table |
| 25 | fixed lever |
| 27 | wire |
| 29 | driving unit |
| 30 | driving motor |
| 31 | first gear |
| 33 | second gear |
| 35 | third gear |
| 37 | fourth gear |
| 39 | wire collecting |
| 41 | first idler |
| 43 | second idler |
| 45 | spring |

DETAILED DESCRIPTION OF PREFERRED EMBODIMENT

Please refer to FIGS. 2 through 6 which illustrate the subject matter platen type scanner driving mechanism (1). The subject matter relates to a type of platen type scanner driving mechanism (1), comprising mainly an optical module 21, an elastic component 22, a carrier table 23, a fixed lever 25, a wire and a driving unit 29.

The platen type scanner driving mechanism (1) is located inside a scanning device comprising an upper casing 15 and a lower casing 17, which drives the optical module 21 to move and perform a scanning operation. On the glass of the upper casing 15 is placed the object to be scanned, while the lower casing 17 which may be made of a transparent acrylic material performs the scanning process.

Inside the optical module 21 are the light source, a reflecting mirror, a lens and an optical sensing component, the light produced from the light source and coming down on the object to be scanned, is reflected through the reflecting mirror into the lens for convergence, then the converged light is focused on the optical sensing component, the optical sensing components then processes the optical signals and transform them into acceptable analog or digital signals.

Below the optical module 21 is an elastic component 22 composed of a number of springs, rubber or elastic pieces, the optical module 21 is positioned inside the carrier table 23. The elastic component 22 is supported between the optical module 21 and the carrier table 23, providing an upward force to assist the optical module 21 to stick to the glass of the upper casing 15 and keep it from being separated.

The fixed lever 25 is fixed inside the scanning device, with its upper part joined to the carrier table 23. The wire 27 coordinates with the driving unit 29, the driving unit 29 drives a driven gear set that is composed of a number of gears, which in turn drives the wire 27 to move in cycles, and moves the optical module 21 in parallel movement. The optical module 21 is driven to move on the fixing level 25 and perform a scanning operation.

The driving unit 29 drives the driven gear set, transmitting force by means of the first gear 31 that is concentrically mounted on a same spindle as the driving motor 30, to drive the second gear 33 to rotate. The third gear 35 that is mounted concentrically with the second gear 33 transmit force to drive the fourth gear 37 to rotate. The wheel 39 that is mounted concentrically with the fourth gear 37 is driven to transmit force, the wheel 39 is a wire collecting wheel.

Figure 4:
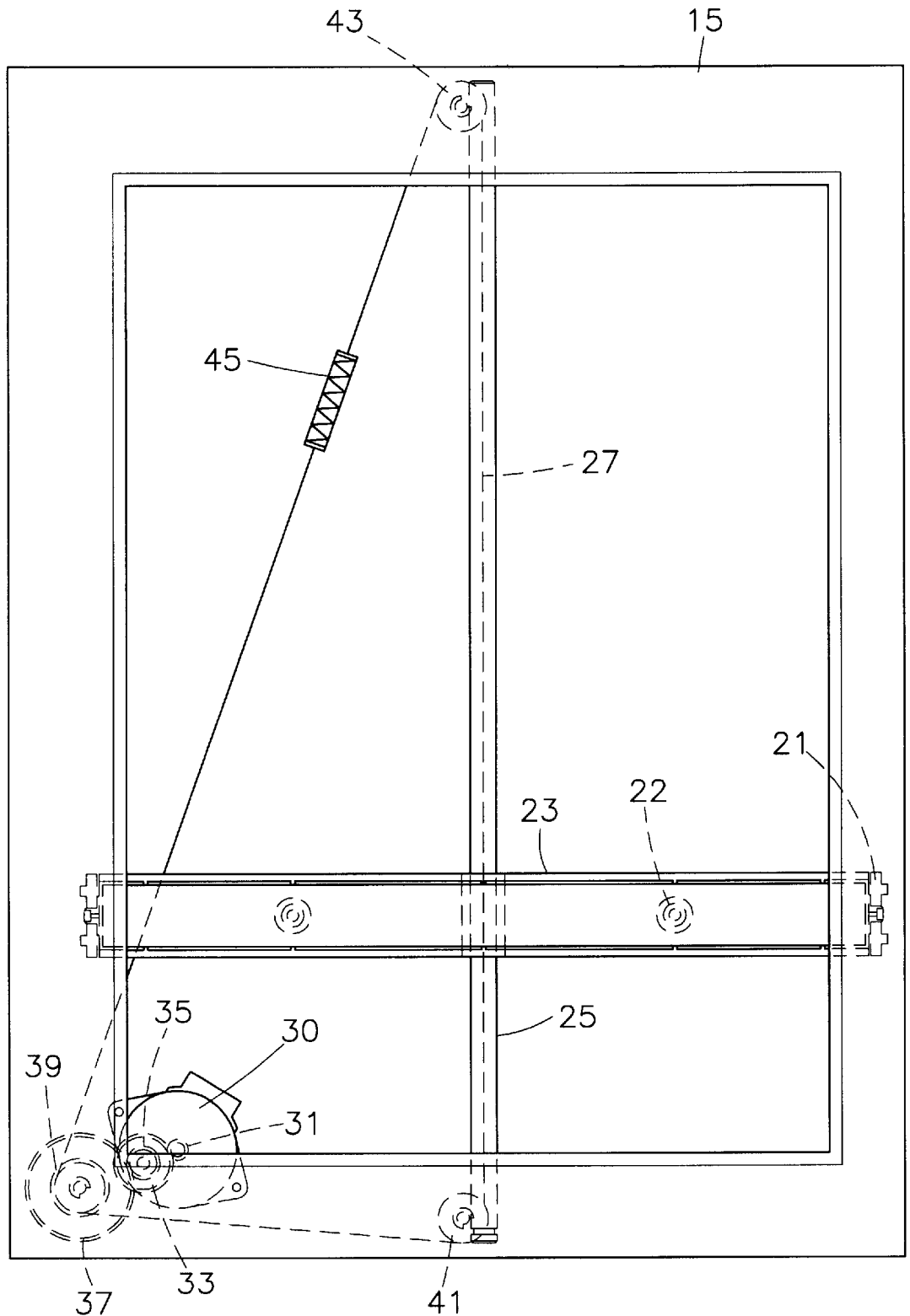
FIG. 4 is a plan view of the subject matter of platen type scanner driving mechanism (1).
Figure 5:
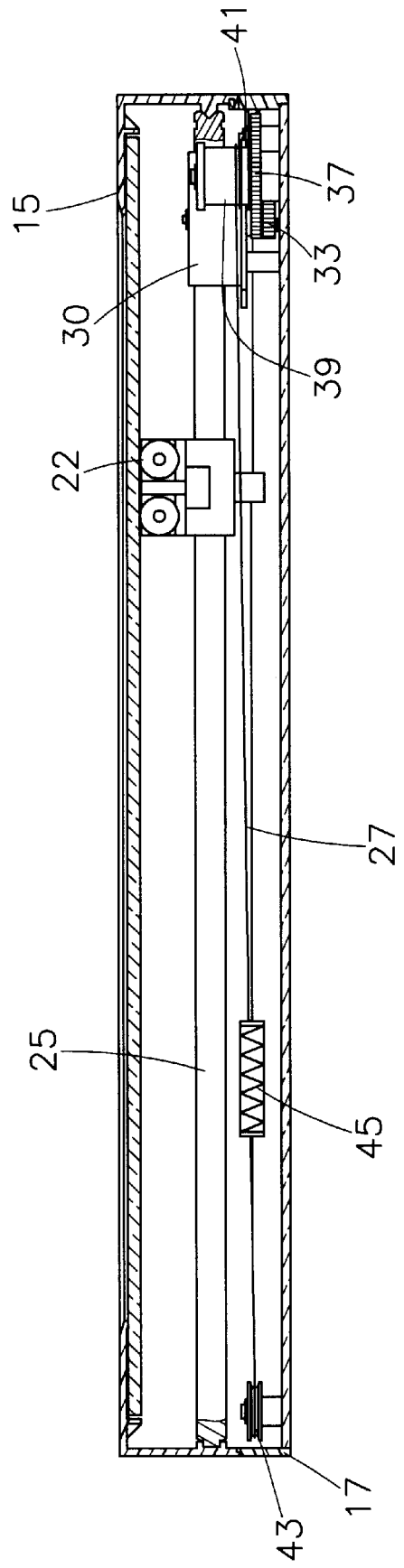
FIG. 5 is a section view of the subject matter of a platen type scanner driving mechanism (1).
Figure 6:
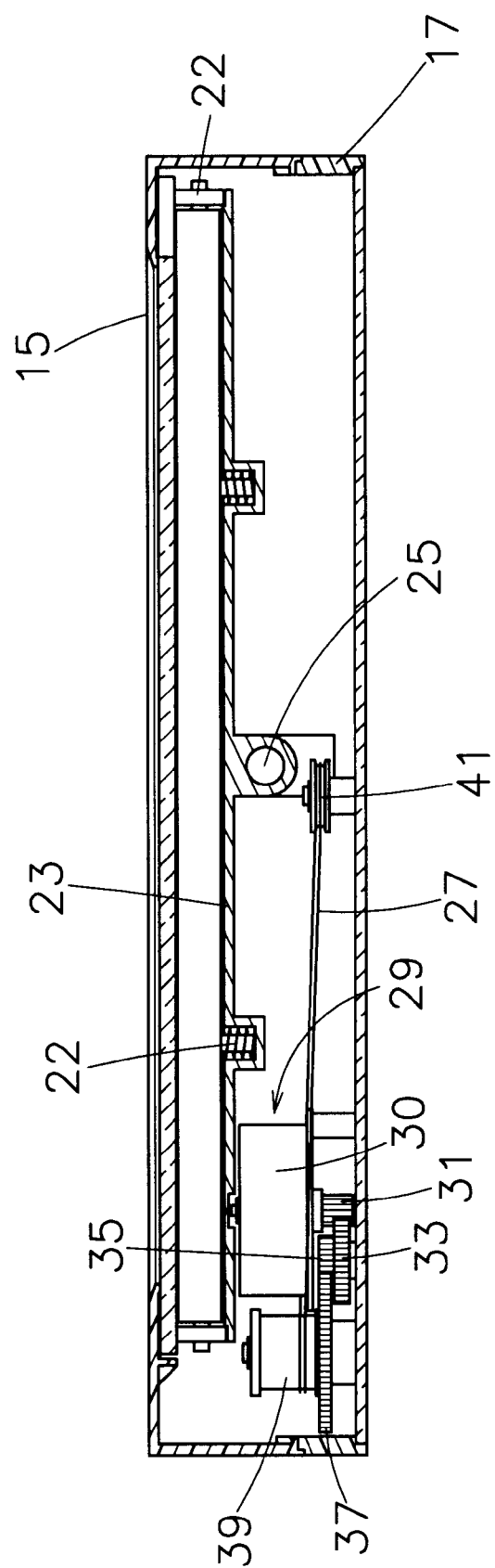
FIG. 6 is a section view of the subject matter of platen type scanner driving mechanism (1).

The first idler wheel and the second idler wheel are located at specified spots on the lower casing 17. The wire 27 is wound on the wheel 39, the first idler wheel 41 and the second idler wheel 43, the wire may be fitted with a spring 45 that provides proper elasticity to prevent the wire 27 from loosening. Opposing ends of the wire 27 are coupled to a centrally disposed portion of the carrier table 23, as shown in FIG. 4.

When the driving unit 29 drives the wire 27 to move in cycles, the driving motor 30 will drive the driven gear set to rotate in a clockwise or counter-clockwise direction, the wheel 39, the first idler wheel 41 and the second idler wheel 43 rotate to is control the optical module 21, driving the optical module 21 to move to the front or rear, the light produced from the light source will be projected on the object to be scanned.

The subject matter of platen type scanner driving mechanism (1) assures parallel movement of the optical module 21, and there being the elastic component below the optical module 21, so with the support from the elastic component, the optical module 21 will firmly stick upwards to the glass of the upper casing 15 and move, so that the difference of height between the glass and the optical module can be absorbed by the elastic component, to assure that the optical module 21 moves steadily to the front and back, thus maintaining consistent light source luminosity and optical distance.

Summing up, with effective improvement on conventional types of platen type scanner driving mechanism which involves such shortcomings as excessive turning moment, excessive load on the driving unit, waste of motor power, inability to maintain parallel movement of the optical module, etc., the subject matter is indeed a novel creation with its novelty and originality that will fully satisfy the qualifications for a patent right, hence this application is filed in accordance with the Patent Law to protect the subject inventor's rights and interests. Your favorable consideration shall be appreciated.

It is declared hereby that the above description, covering only the preferred embodiment of the subject matter, should not be based to limit or restrict the subject claim, and that all equivalent structural and/or configurational variations and/or modifications easily conceivable to anyone skilled in the subject art, and deriving from the subject description with drawings herein shall reasonably be included in the intent of the subject claim.

What is claim is:

1. A platen type scanner driving mechanism located within a casing, comprising:

a fixed lever extending longitudinally within the casing, said fixed lever having a longitudinal axis;

a carrier table extending transversely with respect to said fixed lever and being slidably coupled thereto;

a pair of elastic elements disposed in spaced relationship on said carrier table, each of said pair of elastic elements being disposed at a respective intermediate position along a length of said carrier table;

an optical module disposed on said carrier table and biased by said pair of elastic elements in close proximity to a lower surface of a document supporting glass portion of the casing;

a pair of idler wheels respectively rotatably mounted adjacent opposing longitudinal ends of said fixed lever;

a motor assembly disposed in the casing and having a wire collecting wheel rotatably driven by a motor through a plurality of gears; and, a wire looped around said wire collecting wheel and said pair of idler wheels and extending directly beneath said axis of said fixed lever and being in parallel alignment therewith and having opposing ends thereof coupled to a centrally disposed portion of said carrier table in alignment with said slidable coupling to said fixed lever for maintaining parallelism of scanning by said optical module during longitudinal displacement of said carrier table responsive to rotation of said wire collecting wheel.

\* \* \* \* \*